US009111337B2

(12) United States Patent
Ramirez Giraldo et al.

(10) Patent No.: US 9,111,337 B2
(45) Date of Patent: Aug. 18, 2015

(54) LOW DOSE CARDIAC CT IMAGING WITH TIME-ADAPTIVE FILTRATION

(71) Applicant: Mayo Foundation for Medical Education and Research, Rochester, MN (US)

(72) Inventors: Juan C. Ramirez Giraldo, Durham, NC (US); Cynthia H. McCollough, Byron, MN (US); Shuai Leng, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 30 days.

(21) Appl. No.: 14/053,178

(22) Filed: Oct. 14, 2013

(65) Prior Publication Data

US 2014/0105477 A1    Apr. 17, 2014

Related U.S. Application Data

(60) Provisional application No. 61/712,910, filed on Oct. 12, 2012.

(51) Int. Cl.
| | | |
|---|---|---|
| *G06K 9/00* | (2006.01) | |
| *G06T 5/00* | (2006.01) | |
| *G06T 5/50* | (2006.01) | |

(52) U.S. Cl.
CPC . *G06T 5/002* (2013.01); *G06T 5/50* (2013.01); *G06T 2207/10076* (2013.01); *G06T 2207/10081* (2013.01); *G06T 2207/20012* (2013.01); *G06T 2207/20182* (2013.01); *G06T 2207/30048* (2013.01)

(58) Field of Classification Search
None
See application file for complete search history.

(56) References Cited

U.S. PATENT DOCUMENTS

| | | | | |
|---|---|---|---|---|
| 7,522,744 | B2* | 4/2009 | Bai et al. | 382/100 |
| 7,630,528 | B2* | 12/2009 | Kohler et al. | 382/128 |
| 8,811,700 | B2* | 8/2014 | Wang et al. | 382/128 |
| 2007/0183639 | A1* | 8/2007 | Kohler et al. | 382/131 |
| 2008/0272304 | A1* | 11/2008 | Vija | 250/369 |
| 2009/0076369 | A1* | 3/2009 | Mistretta | 600/407 |
| 2011/0075810 | A1* | 3/2011 | Sendai | 378/95 |
| 2012/0321153 | A1* | 12/2012 | Dwivedi et al. | 382/128 |
| 2013/0142410 | A1* | 6/2013 | Dwivedi et al. | 382/131 |
| 2014/0105477 | A1* | 4/2014 | Ramirez Giraldo et al. | 382/131 |
| 2014/0355858 | A1* | 12/2014 | O'Dell | 382/131 |

OTHER PUBLICATIONS

Boulanger, et al., "Space-Time Adaptation for Patch Based Image Sequence Restoration", IEEE Transactions on Pattern Analysis and Machine Intelligence, vol. 29, No. 6, Jun. 2007, pp. 1096-1100.

(Continued)

*Primary Examiner* — Tahmina Ansari
(74) *Attorney, Agent, or Firm* — Yakov Sidorin; Quarles & Brady LLP (57) ABSTRACT

A system and method for reducing image noise and artifacts in coronary computed tomography angiography includes acquisition of CT images at multiplicity of CT slices arranged in such a fashion throughout the phases of the cardiac cycle as to utilize the majority of the X-ray radiation to which the myocardium exposed during the cycle. The acquired imaging data is processed with the use of a TAF filter to reduce the amount of noise and artifacts associated with the CT's system operating at low tube current. The TAF filter is configured to adapt the filtering strength in time domain according to temporal variations of the same anatomical location as identified in its corresponding CT slices.

9 Claims, 12 Drawing Sheets

(56) References Cited

OTHER PUBLICATIONS

Ramirez Giraldo, "Low Dose and Quantitative Myocardial Perfusion Imaging Using Multidetector Row Computed Tomography", A Thesis submitted to the Faculty of Mayo Clinic, Mar. 2012 pp. 1-220.

Brailean, et al., Noise Reducion Filter for Dynamic Image Sequences: A Review:, Proeedings of the IEEE, vol. 83, No. 9, Sep. 1995, pp 1272-1292.

* cited by examiner

Time-Adaptive Filter (TAF)

Given a 4D dataset $f(x)$
3-spatial-dimensions + time-dimension

* We propose the TAF algorithm, which preferentially filters in the time-dimension avoiding spatial blurring.

* Temporal blurring is avoided by an adaptive weight $b(x)$ which could be either:

$$b(x) = f(x) - f(x_0) \quad \text{difference to background,}$$

$$\text{or, } b(x) = \frac{\partial}{\partial t} f(x) \quad \text{temporal gradient.}$$

FIG. 7A

Time-Adaptive Filter (TAF)

Key premises:

1. Voxels which enhance overtime due to contrast agent arrival/washout are recognized and filtered less, according to $b(x)$.

2. Voxels which keep stable through time are more heavily filtered.

3. When filtering preferentially occurs in time dimension, it allows to reduce noise and avoids spatial blurring.

FIG. 7B

Time-Adaptive Bilateral Filter $$g(\mathbf{x}) = k^{-1}(\mathbf{x}) \int_\Omega f(\xi) d(\xi, \mathbf{x}) s[f(\xi), f(\mathbf{x})] b(\mathbf{x}) d\xi$$

$d(\xi, \mathbf{x})$     Temporal distance of center voxel $\mathbf{x}$ to neighbors $\xi$ $s[f(\xi), f(\mathbf{x})]$     Signal intensity similarity of $\mathbf{x}$ and its neighbors $\xi$ $b(\mathbf{x})$     Time-adaptive weight function $k(\mathbf{x})$     Serves as normalization factor and defined as follows $$k(\mathbf{x}) = \int_\Omega d(\xi, \mathbf{x}) s[f(\xi), f(\mathbf{x})] b(\mathbf{x}) d\xi$$

\* Bilateral Filter selected for simplicity (other candidates possible, e.g., we're currently studying patch-based denoising with non-local means algorithm)

FIG. 7C

Time-Adaptive Bilateral Filter

All weights were chosen as exponential functions, as follows:

$$D = \exp\left(-\frac{d(\xi, \mathbf{x})^2}{2\sigma_d^2}\right) \quad \text{Temporal distance}$$

$$S = \exp\left(-\frac{|f(\mathbf{x}) - f(\xi)|^2}{2\sigma_s^2}\right) \quad \text{Intensity similarity}$$

$$B = \exp\left(-\frac{b(\mathbf{x})^2}{2\sigma_b^2}\right) \quad \text{Time-Adaptive weight}$$

Hence, three parameters are necessary to be defined:
$$\sigma_d, \sigma_s, \sigma_b$$

LOW DOSE CARDIAC CT IMAGING WITH TIME-ADAPTIVE FILTRATION

CROSS-REFERENCE TO RELATED APPLICATIONS

The present application claims priority from and benefit of the U.S. Provisional Patent Application No. 61/712,910 filed on Oct. 12, 2012 and titled "Low Dose Coronary CTA With Time-Adaptive Filtration." The disclosure of the above-identified provisional patent application is incorporated herein by reference in its entirety.

TECHNICAL FIELD

The present invention relates to system and methods adapted for use with cardiac CT imaging and, more particularly, to the cardiac CT imaging systems and methods that facilitate the formation of an image with the use of X-rays received at the detector during multiple sequential and, optionally, contiguous cardiac phases without degradation of image quality.

BACKGROUND ART

In an x-ray computed tomography ("CT") system, an x-ray source projects a fan-shaped or cone-shaped beam of x-rays that is collimated to lie within an x-y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object, and each detector produces a separate electrical signal that is a measurement of the beam attenuation. The attenuation measurements from all of the detectors are acquired separately to produce a transmission profile at a particular view angle.

The source and detector array in a conventional CT system are rotated on a gantry within the imaging plane, and around the object so that the angle at which the x-ray beam intersects the object constantly changes. A group of x-ray attenuation measurements from the detector array at a given angle is referred to as a "view," and a "scan" of the object includes a set of views acquired at different angular orientations during one revolution of the x-ray source and detector. In a 2D scan, data is processed to reconstruct an image that corresponds to a two dimensional slice taken through the object. The prevailing method for reconstructing an image from 2D data is referred to in the art as the filtered backprojection technique. This process converts the attenuation measurements from a scan into integers called "CT numbers," or "Hounsfield units," which are used to control the brightness of a corresponding pixel on a display.

In recent years, a dramatic improvement in multi-detector CT technology has occurred. The ability to noninvasively image the coronary artery lumen and wall and obtain information on the presence, severity, and characteristics of coronary artery disease (CAD) became an attractive addition to currently available diagnostic tools (such as, for example, nuclear perfusion imaging or invasive selective coronary angiography) for patient workup. For example, according to several studies, a common type of cardiac CT imaging technique referred to as the coronary CT angiography (CCTA) provides substantially high diagnostics accuracy to detect stenoses (with sensitivity well in excess of about 73 percent and specificity of about 90 to about 97 percent). At first, CCTA was performed with a continuous level of tube current and with concurrent recording of the ECG, such that one can retrospectively select cardiac phases of interest within diastole or systole. To reduce radiation dose, further advances of CCTA technique included the modulation of the tube current for different cardiac phases, as a result of which the X-ray exposure of the object of imaging may be limited to chosen cardiac phases (single phase, if necessary). A cardiac cycle is conventionally understood as the time between two heart beats. To identify the heart beats, CCTA uses the electrocardiographic (ECG) signal where the cardiac cycle is represented by the time between two R waves. For practical purposes, in CCTA the cardiac cycle is typically divided into 20 or 10 phases (corresponding, respectively, to every 5 or 10% of the R-R interval). The systole typically includes cardiac phases corresponding to a range of the R-R-interval from 0% to about 40%, while the diastole typically includes cardiac phases corresponding to a range of the R-R interval from about 40% to about 100%.

Depending on clinical needs, physicians can be interested in one or multiple cardiac phases. After the CCTA exam, it is possible to obtain a volume of the whole heart comprising the myocardium, chambers, cardiac tissue and its vessels for all cardiac phases. In currently employed ECG-triggered CCTA methodologies, a choice has to be made between a) reducing the dose of radiation exposure of the patient by limiting the optimal CT acquisition time window (which window corresponds to the maximum tube current) to only the desired cardiac phase(s), as a result drastically reducing the image quality of cardiac phases out of the phase selected and also lowering the probability of an optimal scan when heart rate changes or patient moves, and b) maintaining the data acquisition at high levels of CT-tube current and, therefore, keeping high image quality for all cardiac phases while increasing robustness to instabilities of heart rate, but, at the same time, substantially increasing radiation dose to which the object of imaging is being exposed. In the case where imaging data was acquired during all cardiac cycles but only one optimal cardiac phase is reconstructed for diagnostic purposes, a portion of the emitted CT radiation is wasted, for the purposes of imaging.

Accordingly, there remains a need in a method and system facilitating optimization of the cardiac imaging process in general and the CCTA process in particular.

SUMMARY OF THE INVENTION

Embodiments of the present invention provide a method for reducing noise and artifacts in a cardiac imaging with the use of a computed tomography (CT) system. The method includes acquiring multiple sets of medical imaging data during different consecutive cardiac phases of a cardiac cycle with the use of radiation provided by the CT system, among which sets each set of data represents a heart of a subject at a respectively corresponding cardiac phase. Multiple sets of data are respectively associated with heart images corresponding to the different consecutive cardiac phases. The method further includes applying, in a computer process, a time-adaptive filtering algorithm to data contained in at least two sets of data to form a set of low-noise imaging data. The time-adaptive filtering is effectuated in such as fashion that mutually corresponding first data points (in the at least two sets of data) that represent first image pixels the first intensities of which rapidly change between the corresponding cardiac phases are filtered to a lesser degree than mutually corresponding second data points representing second image pixels the second intensities of which do not exhibit such rapid changes. In a specific case, the step of acquiring includes acquiring multiple sets of imaging data at cardiac phases chosen such that a radiation dose received by the heart throughout these cardiac phases accounts for a majority of the radiation does received by the heart during the cardiac cycle.

The method of the invention may further include a step of reconstructing an image of the heart acquired while the heart was undergoing motion using at least the set of low-noise imaging data. Alternatively or in addition, the application of the time-adaptive filtering algorithm may include averaging CT slices of the different consecutive cardiac phases with respectively-corresponding weighting factors in a temporal domain. In a specific implementation, the weighting factor is defined as $$D = \exp\left[-\frac{d(\xi, r)^2}{2\sigma_d^2}\right],$$

where $d(\xi,r)$ is a function that measures a duration of time corresponding to a separation between a center voxel, at r, of an image of the heart and a neighboring voxel, at $\xi$ of said image, and $\sigma_d$ is a distance coefficient. Furthermore, $\sigma_d$ may be exponentially dependent on a function representing modulation of a strength of said time-adaptive filter.

In a related embodiment, the step of acquiring multiple sets of data of the method may include (i) acquiring a first set of medical imaging data representing the heart during a first portion of the cardiac cycle, which first portion corresponds to a first dose of radiation provided by the CT system, and where the first set of medical imaging data contains first multiple CT slices; and (ii) acquiring a second set of medical imaging data representing the heart during a second portion of the cardiac cycle, which second portion corresponds to a second dose of radiation provided by the CT system, and where the second dose is higher than the first dose, and where the second set of medical imaging data contains second multiple CT slices. In this case, at least one of the first and second multiple slices are not associated with the same portion of the cardiac cycle and, optionally, the acquisition of the first set of medical imaging data and the acquisition of the second set of medical imaging data are effectuated such that a radiation dose received by the heart during the first and second multiple CT slices accounts for a majority of the radiation dose received by the heart during the cardiac cycle.

Embodiments of the present invention additionally provide a method for reducing noise and artifacts in coronary computed tomography angiography (CCTA) images acquired with the use of a computed tomography (CT) system and, in particular, the noise related to the CT system's operation at low tube current (which results in a low radiation dose). Embodiments of the method are directed to reducing streak artifacts that are not temporally coherent and to maintaining the temporal resolution, thereby resulting in minimal blurring of time-related image information. The method includes acquiring a first set of medical imaging data representing a myocardium during a first cardiac phase corresponding to a first dose of radiation provided by the CT system, said first set of medical imaging data corresponding to first multiple CT slices; and acquiring a second set of medical imaging data representing said myocardium during a second cardiac phase corresponding to a second dose of radiation provided by the CT system. When so acquiring data, the first and second phases of the cardiac cycle are chosen such that the second dose of radiation is higher than the first dose. The second set of medical imaging data corresponds to second multiple CT slices. At least one of the first and second multiple slices corresponds to a transition between the first and second cardiac phases. The method further comprises applying, in a computer process, a time-adaptive filtering algorithm to at least one of the first and second sets of imaging data such that a degree of data filtering applied to medical imaging data associated with a CT slice corresponding to the first dose differs from a degree of data filtering applied to medical imaging data associated with the second dose of radiation, to form a set of low-noise imaging data. In a specific embodiment, the applied filtering algorithm is such that a degree of data filtering used to filter medical imaging data associated with a CT slice corresponding to a transition between the phases of the cardiac cycle differs from a degree of filtering applied to a different CT slice.

In one embodiment, acquiring a first set of medical imaging data and acquiring a second set of medical imaging data are such that a radiation dose received by the myocardium during said first and second multiple CT slices accounts for a majority of the radiation dose received by the myocardium during the cardiac cycle. In a related embodiment, applying a time-adaptive filtering algorithm includes combining consecutive CT slices with appropriate weighting factors in a temporal domain. The method optionally further comprises reconstructing an image of the myocardium acquired while undergoing motion using at least the set of low-noise imaging data.

BRIEF DESCRIPTION OF THE DRAWINGS

The invention will be more fully understood by referring to the following Detailed Description in conjunction with the Drawings, of which.

DETAILED DESCRIPTION

The present invention stems from the realization that the cardiac imaging procedure (and, in a specific case, the CCTA) can be carried out while using substantially all X-rays delivered to the heart (in a specific case—myocardium) without compromising imaging resolution. In accordance with embodiments of the present invention, the imaging data are received by registering a multiplicity of CT slices (or CT data sets, each set corresponding to a different cardiac phase or sub-portion of the cardiac cycle, and processing the received data corresponding to several different cardiac phases with the use of an algorithm employing a time adaptive filter (TAF) of the invention to improve imaging resolution and/or decrease image noise. The multiplicity of the acquired data sets can be procured in one or multiple cardiac phases (for example, cardiac phases within diastole and/or systole).

Figure 1A:
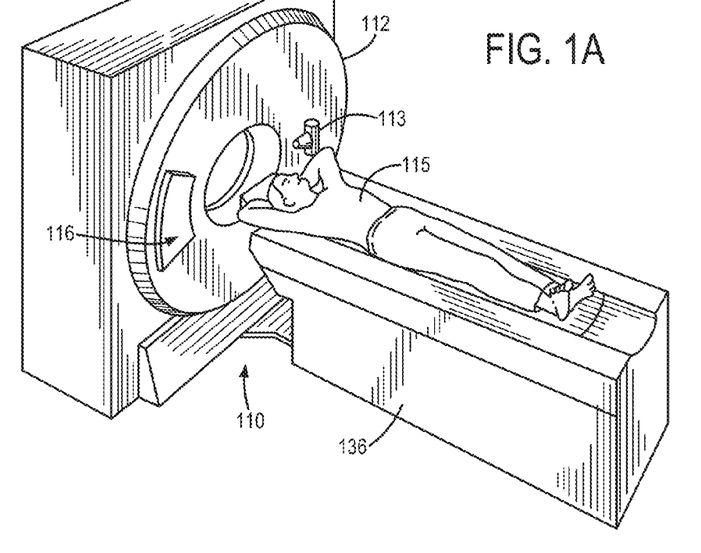
FIG. 1A is a pictorial view of an x-ray computed tomography (CT) imaging system for use with an embodiment of the present invention.
Figure 1B:
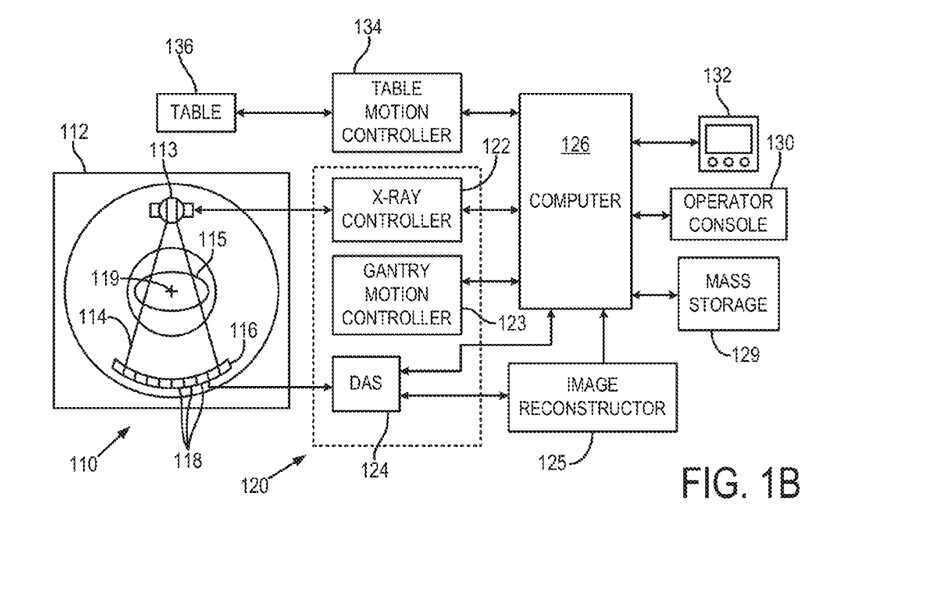
FIG. 1B is a block diagram of the CT imaging system of FIG. 1A.

With initial reference to FIGS. 1A and 1B, an x-ray computed tomography ("CT") imaging system 110 includes a gantry 112 representative of a "third generation" CT scanner. Gantry 112 has an x-ray source 113 that projects a fan-beam, or cone-beam, of x-rays 114 toward a detector array 116 on the opposite side of the gantry. The detector array 116 is formed by a number of detector elements 118 which together sense the projected x-rays that pass through a medical patient 115. Each detector element 118 produces an electrical signal that represents the intensity of an impinging x-ray beam and hence the attenuation of the beam as it passes through the patient. During a scan to acquire x-ray projection data, the gantry 112 and the components mounted thereon rotate about a center of rotation 119 located within the patient 115.

The rotation of the gantry and the operation of the x-ray source 113 are governed by a control mechanism 120 of the CT system. The control mechanism 120 includes an x-ray controller 122 that provides power and timing signals to the x-ray source 113 and a gantry motor controller 123 that controls the rotational speed and position of the gantry 112. A data acquisition system ("DAS") 124 in the control mechanism 120 samples analog data from detector elements 118 and converts the data to digital signals for subsequent processing. An image reconstructor 125, receives sampled and digitized x-ray data from the DAS 124 and performs high speed image reconstruction. The reconstructed image is applied as an input to a computer 126 which stores the image in a mass storage device 128.

The computer 126 also receives commands and scanning parameters from an operator via console 130 that has a keyboard. An associated display 132 allows the operator to observe the reconstructed image and other data from the computer 126. The operator supplied commands and parameters are used by the computer 126 to provide control signals and information to the DAS 124, the x-ray controller 122 and the gantry motor controller 123. In addition, computer 126 operates a table motor controller 134 which controls a motorized table 136 to position the patient 115 in the gantry 112.

In recent years, a dramatic improvement in multi-detector CT technology has occurred. The ability to noninvasively image the coronary artery lumen and wall and obtain information on the presence, severity, and characteristics of coronary artery disease (CAD) became an attractive addition to currently available diagnostic tools (such as, for example, nuclear perfusion imaging or invasive selective coronary angiography) for patient workup. For example, according to several studies, the coronary CT angiography (CCTA) provides substantially high diagnostics accuracy to detect stenoses (with sensitivity well in excess of about 73 percent and specificity of about 90 to about 97 percent). While the following discussion is presented using the example of the CCTA, it is appreciated that the scope of the invention includes and is applicable to cardiac imaging in general.

When the diagnostic assessment of coronary CTA is performed, high-quality images of the heart are most important pre-requisite. Patients are positioned on the CT examination table usually in the supine position, with electrocardiography (ECG) leads attached to obtain adequate ECG tracing. To reduce the dose of radiation, the CCTA is performed with ECG gating, thereby limiting the X-ray exposure to a time window that includes only judiciously chosen cardiac phases (only a single phase, if necessary). The contrast agent is administered usually through an intravenous line, and CT scan(s) is (are) taken during multiple heart beats. The image quality must be ensured through multiple steps, including patient preparation, the actual CCTA scan, and the synchronization of raw image data with electrocardiography (ECG) information, for example, which enables the reconstruction of ECG-gated images.

In addition, the image quality of CCTA is known to substantially improve in patients with low and stable heart rate (for example, below about 65 beats per minute or bpm). Indeed, for higher and/or unstable heart rate, a major technical challenge to such imaging is temporal resolution. Any motion, whether breathing or body movements or movements of the beating heart, leads to spatial blurring, for example.

Figure 2:
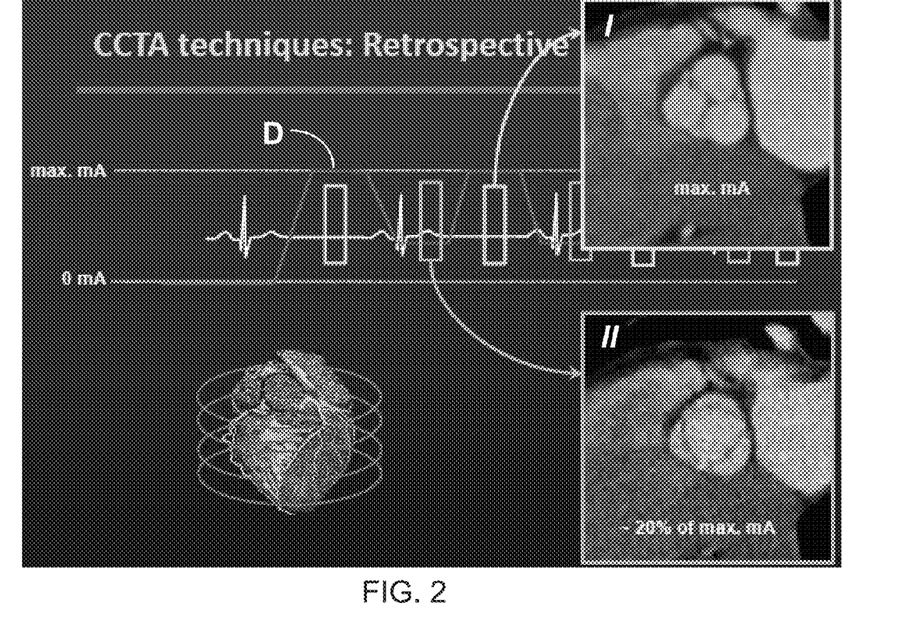
FIG. 2 is a diagram schematically illustrating CCTA carried out in retrospective (spiral) ECG-triggered mode.
Figure 3:
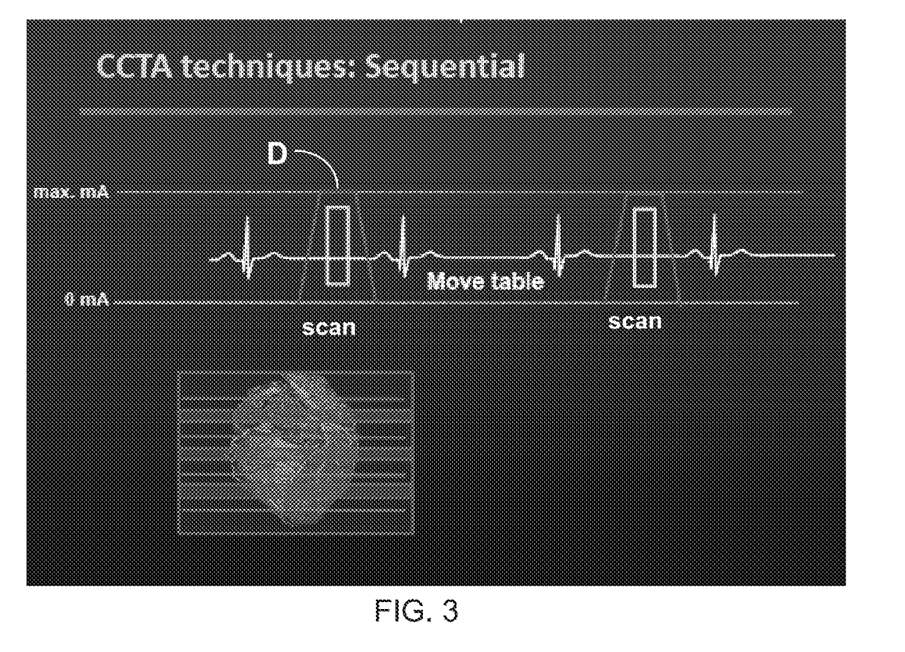
FIG. 3 is a diagram schematically illustrating CCTA carried out in sequential ECG-triggered mode.
Figure 4:
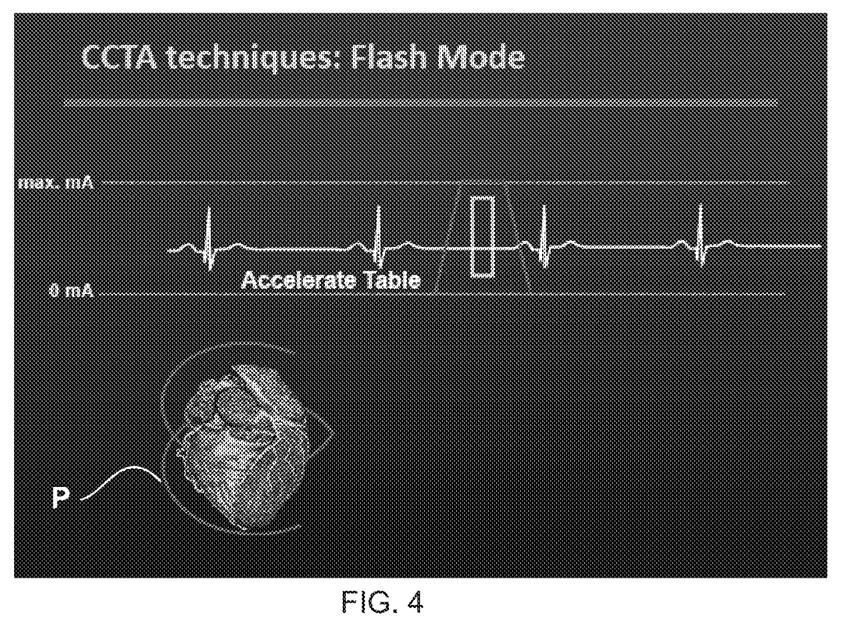
FIG. 4 is a diagram schematically illustrating CCTA carried out in a "flash" ECG-triggered mode.
Figure 5:
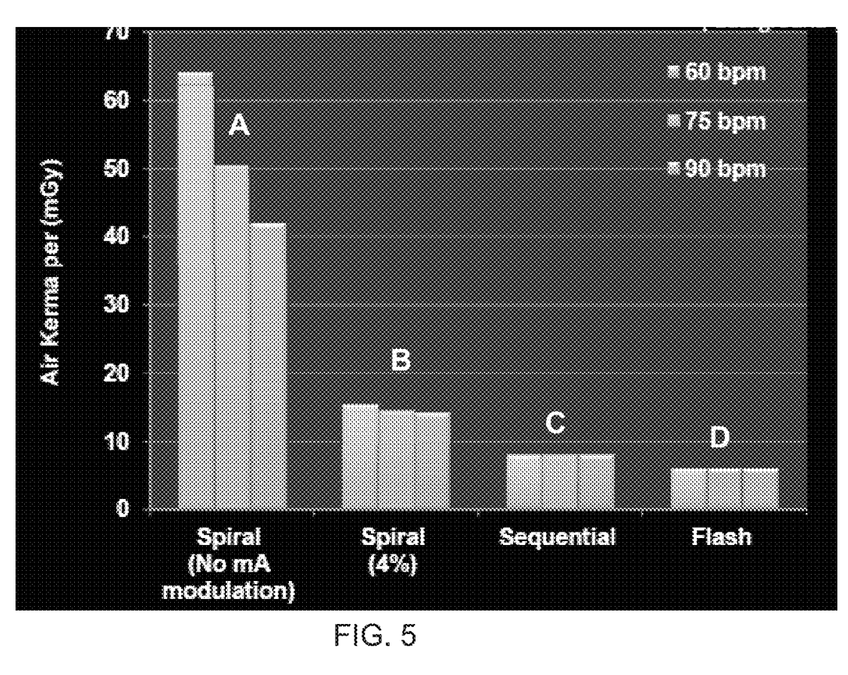
FIG. 5 shows approximate radiation doses to which a heart is exposed when imaged with CCTA in (A) retrospective (spiral) mode of FIG. 2 with no current modulation, (B) retrospective (spiral) mode of FIG. 2 with modulation of current down to about 4% of the maximum level; (C) sequential mode of FIG. 3; and (D) flash mode of FIG. 4.

Several CCTA acquisition methods are employed. With the so-called retrospective CCTA method, and in reference to FIG. 2, the radiation dose is modulated during the complete spiral CT scan by using the information from the patient's ECG. The tube current is maintained at about 100% of the desired level only during predetermined cardiac phases (as shown, around diastolic portion D of the cardiac cycle). During the rest of the time, for example in the systolic portion S of the cardiac cycle, the current is reduced (to as low as, for example, 20% of the maximum level or even lower), thereby reducing the mean radiation dose. ECG-controlled dose modulation is based on the continuous monitoring of the ECG and an algorithm that predicts moment(s) in time when the desired cardiac phase(s) will start by calculating the mean durations of the preceding cardiac cycles. While all cardiac phases are available for imaging in the retrospective CCTA, this method utilizes a larger radiation dose, when using the maximum tube current in a wide temporal window, around the phases of interest. Images acquired at lower levels of tube current (such as, for example, an image II shown in a subset of FIG. 2) have suboptimal quality in comparison with images acquired at higher current levels (such as an image I). In reference to FIG. 3, the so-called ECG-triggered sequential CCTA the axial slices are acquired and only the very minimum of scan data needed for image reconstruction are acquired during the selected cardiac phases (as shown, phases within diastole). With monitoring the ECG-signal, the axial scans are started with a pre-defined temporal offset relative to the R-waves. This method uses the lowest possible radiation dose when imaging data are acquired in a single cardiac phase. In practice, however, the single-phase image acquisition is rarely, if ever, possible. Instead, the imaging data are acquired in a wide time window of phases during which the X-rays are on. A so-called "Flash mode", illustrated schematically in FIG. 4, requires a dual-source CT scanner and an imaging "spiral" path with a pitch P that is limited to about 3.4 to ensure gapless volume coverage along the z-axis. If the pitch is increased sampling gaps occur that hamper reconstruction of images.

All of the above methods possess common shortcoming in that a trade-off has to be made between exposing the patient to a large dose of radiation (for example, by increasing the temporal window with maximum tube current) and acquiring images with lower quality. As a result of such trade-off, large percent of radiation delivered to the heart often remains unused for the imaging purposes. (In addition, in some cases, only imaging data acquired during the operationally-optimal phase of the cardiac cycle (such as the phase during which the tube current level is reduced) is reconstructed for diagnostic purposes, thereby additionally contributing to lower quality of images.) For example, for a patient with about 60 bpm, and with X-rays switched on during the acquisition window between about 50% and 80% of the RR phase, and assuming image reconstruction with best possible resolution, only about 40%+/−6% of the delivered X-rays are used to form the best diastolic phase image in retrospective CCTA mode with current modulation down to 20% (in the systolic phases, as compared to the maximum value).

Figure 6:
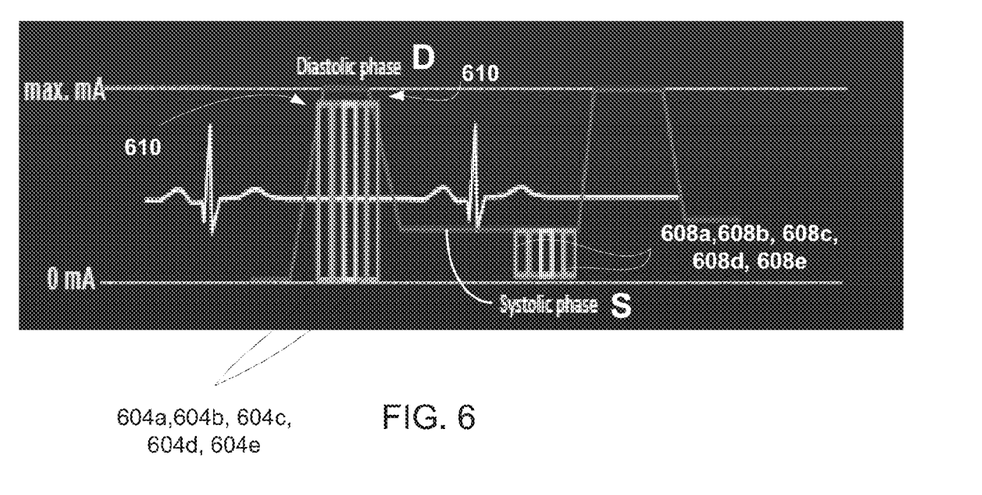
FIG. 6 illustrates the arrangement of phases of a cardiac cycle used for acquisition of imaging data representing the heart during the motion (occurring during and between phases of the cardiac cycle) according to an embodiment of the invention.

As shown in FIG. 6, schematically illustrating the idea of the invention, cardiac imaging data sets are taken in temporal phases 604a through 604e within the diastole D such as to utilize most of the duration of the diastole D. As shown in the specific example of FIG. 6, the respectively corresponding data sets are received by the system to enable the reconstruction of the contiguous phases in the diastole D. However, it is appreciated that, in general, the consecutive data sets do not have to correspond to cardiac phases that are adjacent in time, but can be acquired during sequential time windows any two of which are separated by a time gap. Alternatively or in addition, a predetermined number of cardiac phases (as shown, phases 608a through 608e) can be taken during the systolic phase S such as to cover at least a portion of the duration of the phase S and, optionally, a portion of transition between the S and D phases. Stated differently, during the cardiac imaging according to an embodiment of the invention, a multiplicity of CT data sets is taken where each set corresponds to a different cardiac phase.

In practice, since the CT data acquisition according to the idea of the invention may be performed at any time throughout the entire cardiac cycle, and hence comprise multiple cardiac phases (during the diastole, during the systole, during the period of transition between the diastole and systole), while enabling the system to collect imaging data at varying CT tube current levels, at least some of the data-acquisition moments are likely to coincide with time windows during which the heart is moving substantially enough to introduce "blurring" into the image formed based on the collected imaging data. Examples of such time windows, indicated in FIG. 6 with numerals 610, are shown to coincide and/or overall with or be contemporaneous with the phases 604a and 604e. CT data sets acquired as a result of exposure of the heart to X-rays during the phases 604a through 604e are further processed according to the TAF algorithm to suppress noise and preserve temporal and spatial resolution of the image. The same approach can be employed, in addition or alternatively, to process the data acquired during phases coinciding with systole S (during which the image data is taken at low levels of the CT tube current), to reconstruct an image formed with the imaging data received during time windows corresponding to the movement of myocardium by removing imaging artifacts associated with such movement and/or low levels of exposure of the object to X-rays. It is appreciated that, in a specific embodiment of the invention, the degree of filtering of acquired images is adapted to differ between the images corresponding to different cardiac phases. For example, a degree of TAF-filtering corresponding to a CT measurement taken at the time of transition between the diastole and systole (such as, for example, measurements takes during the phases 604a, 604e of FIG. 6) may differ from a degree of TAF filtering applied to data sets taken during the phases 604b-604d that are substantially in the middle of the diastole.

The image noise in a CT image is generally inversely proportional to the square root of the tube-current-time product. Hence, an increase of the acquisition time while maintaining constant tube current reduces image noise. Likewise, conventional averaging methods that utilize averaging of two or more consecutive images taken over the same scan range should lead to a reduction of image noise, although at the expense of blurring the spatial and time information due to the rapid motion of the heart. When the filtering or averaging process is applied in the time dimension only, the spatial resolution is not affected (assuming there is no subject motion and/or assuming it is corrected for motion first), and the texture of the CT images is preserved. Preservation of image texture has been shown to be an important aspect for confident diagnosis of physicians when reading the images. To achieve such minimization of blurring due to averaging in time domain, it is possible to use edge-preserving algorithms that will better maintain time variations as compared to conventional averaging filters. The TAF method seeks to maintain advantages of time filtering (such as noise reduction, image texture preservation) but adds minimization of temporal blurring.

Embodiments and discussion of the TAF are illustrated in FIGS. 7A through 7G.

Assuming that the dataset f(r) is defined over 4 dimensions (4D) (3 spatial dimensions and the time dimension), the TAF filter uses an adaptive function $b(r)=f(r)-f(r_0)$ to enable filtering of data preferentially in time dimension to modulate the filter strength and to avoid temporal blurring. Voxels that rapidly change their intensity over time are filtered less than those voxels that do not exhibit such rapid changes. Here, b(r) is calculated as the difference in signal amplitude at each point relative to background. In the alternative, the adaptive function b(r) may represent a temporal gradient of the 4D dataset f(r): $b(r)=\delta f(r)/\delta t$. The time-adaptive function b(r) is intended to be used in combination with existing edge-preserving filters (such as a bilateral filter, for example, or a filter employing the non-local means). For example, and in reference to FIG. 7l), a time-dependent weighting function can be defined as $$D = \exp\left[-\frac{d(\xi, r)^2}{2\sigma_d^2}\right]$$ Eq. (1)

where $d(\xi, r)$ is a function that measures the time distance between the center voxel (at r) to its neighbors (at $\xi$), and $\sigma_d$ is a distance coefficient that controls the fall-off of the exponential function. Eq. (1) describes an example of a Gaussian filter and is also equivalent to a low-pass filter.

In TAF, the coefficient $\sigma_d$ is not constant but rather varies as a function of b(r):

$$\sigma_d = \sigma_t + c\sigma_t \exp\left(-\frac{b(r)^2}{2\sigma_b^2}\right), \quad \text{Eq. (2)}$$

where $\sigma_t$ is a user-defined coefficient controlling the minimum amount of filtering, and the parameter $\sigma_b$ is defined as the adaptive weights coefficient controlling the extent of time filtering according to the function b(r). The coefficient c is a constant controlling the maximum amount of filtering with respect to the parameter $\sigma_t$. If the function b(r) is large (for example, as in a voxel with rapid signal change), the amount of filtering is decreased. However, if b(r) is small, the amount of filtering is increased beyond the minimum filtering level, thereby effectuating a larger noise reduction.

Figure 7A:
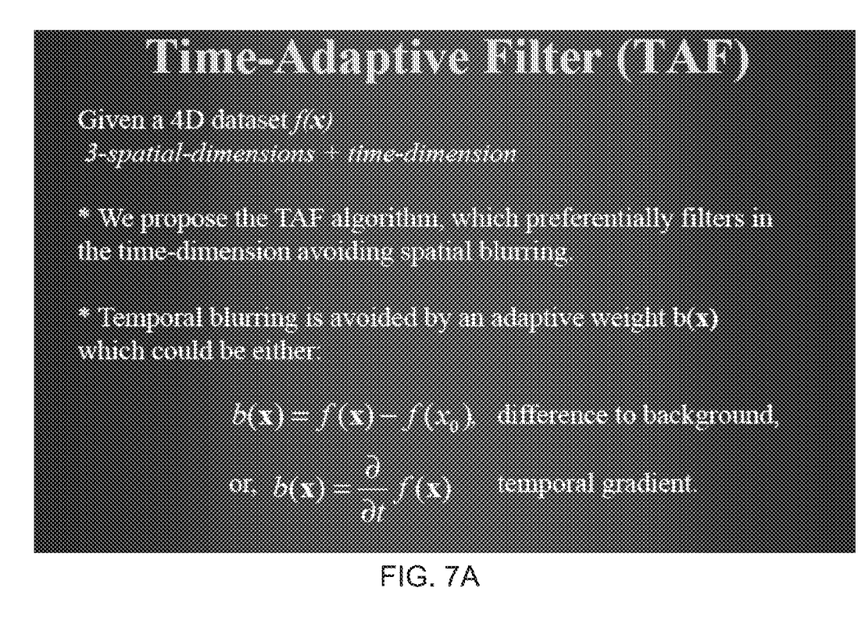
FIGS. 7A, 7B, 7C, 7D, 7E, 7F, and 7G are diagrams illustrating an embodiment of time-adaptive data filtering (TAF) algorithm used in conjunction with data acquisition according to the embodiment of FIG. 6.
Figure 7B:
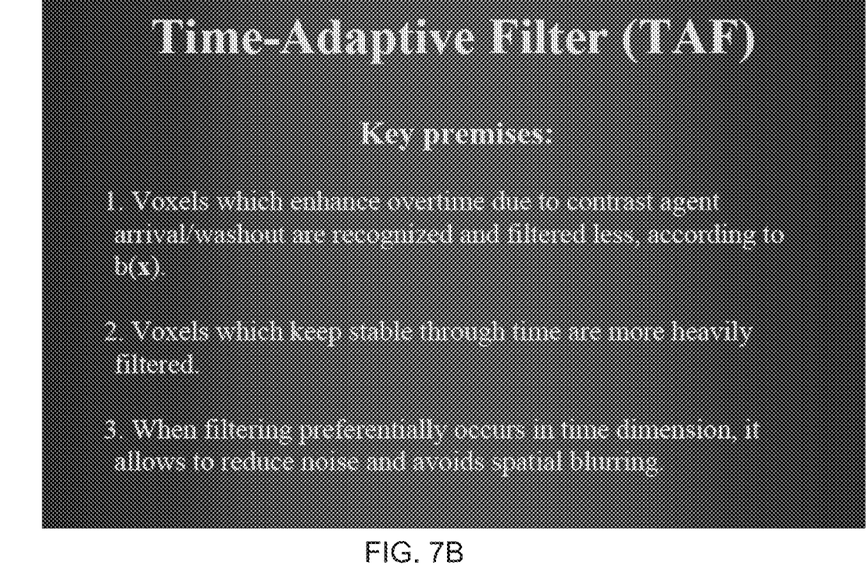
Figure 7C:
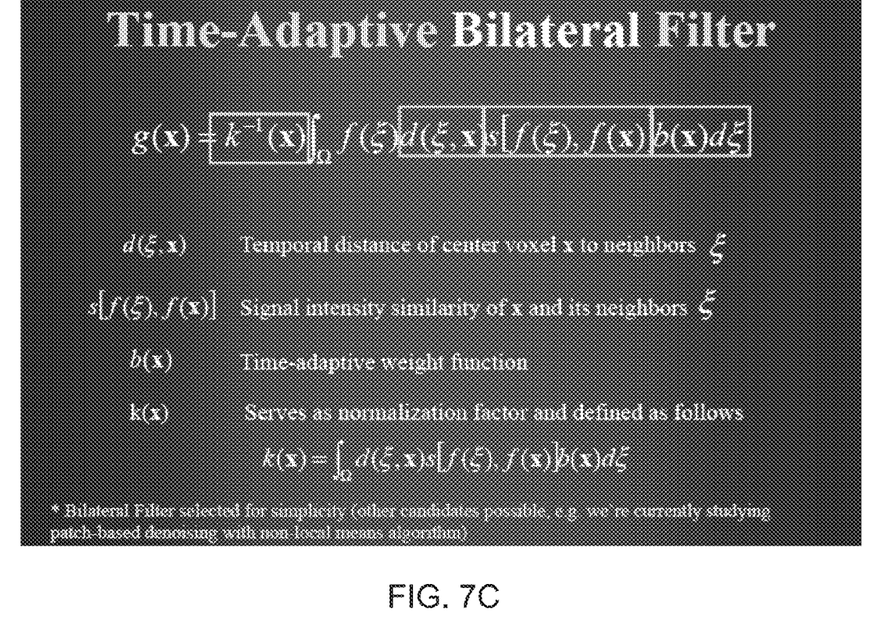
Figure 7D:
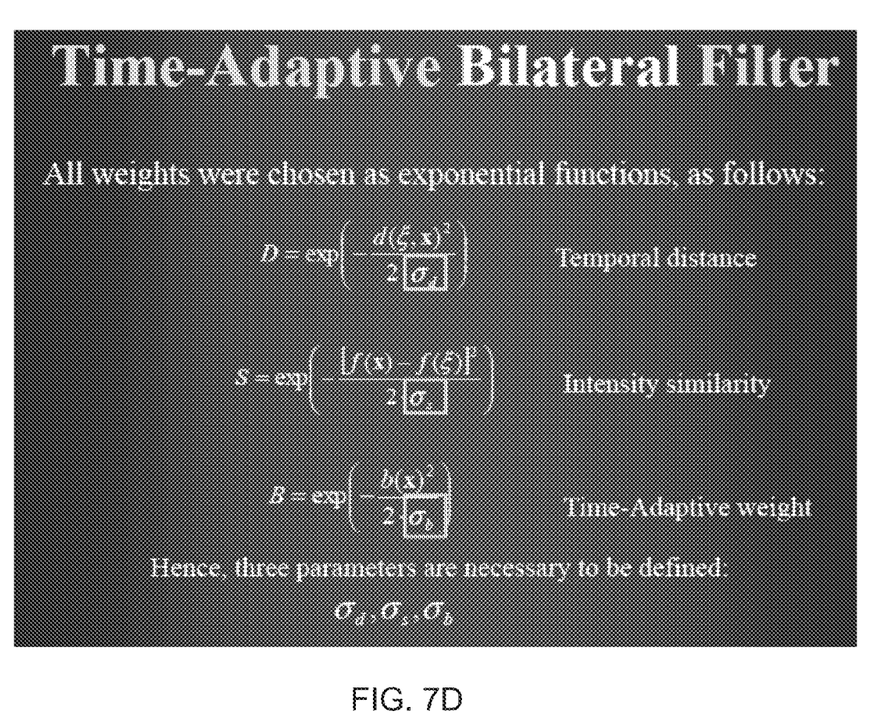

In reference to FIG. 7C, the bilateral filter method involves the use of a Gaussian filter, as in Eq. (1), and a photometric similarity function $$s = \exp\left[-\frac{[f(r) - f(\xi)]^2}{2\sigma_s}\right] \quad \text{Eq. (3)}$$

that measures the intensity similarity of voxel r and its neighbors $\xi$, and where $\sigma_s$ is the photometric coefficient. The output g(r) is the result of the application of the bilateral filter to the input data f(r), and is defined as $$g(r) = k^{-1}(r) \sum_\Omega f(\xi) d(\xi, r) s[f(\xi), f(r)] \quad \text{Eq. (4)}$$

where k(r) is a normalization term defined as $$k(r) = \sum_\Omega d(\xi, r) s[f(\xi), f(r)] \quad \text{Eq. (5)}$$

An example of a specific situation, when the distance function d($\xi$,r) in Eq. (4) uses an adaptive $\sigma_d$ (for example, as in Eq. (2)) with respect to the time-adaptive function b(r) b(r), corresponds to the temporally adaptive bilateral filter.

Figure 7E:
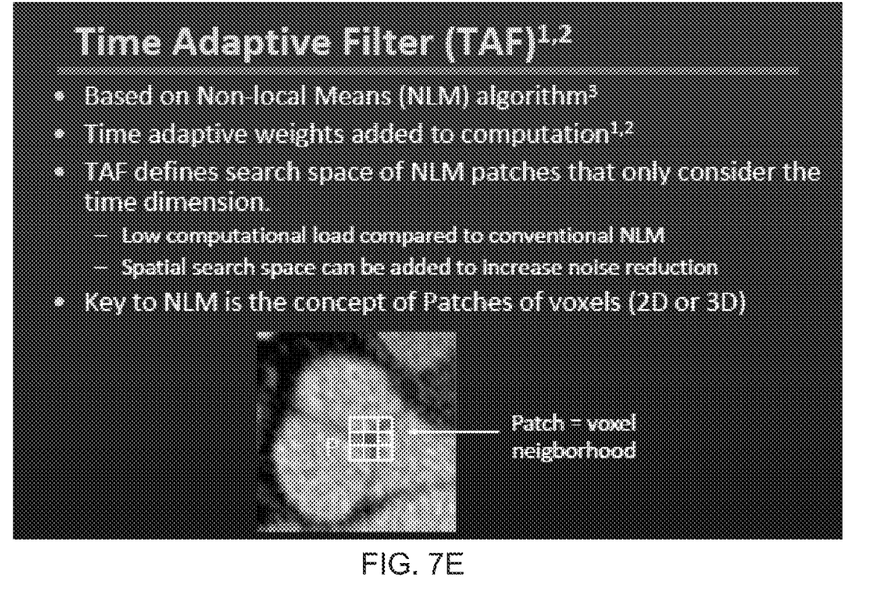
Figure 7F:
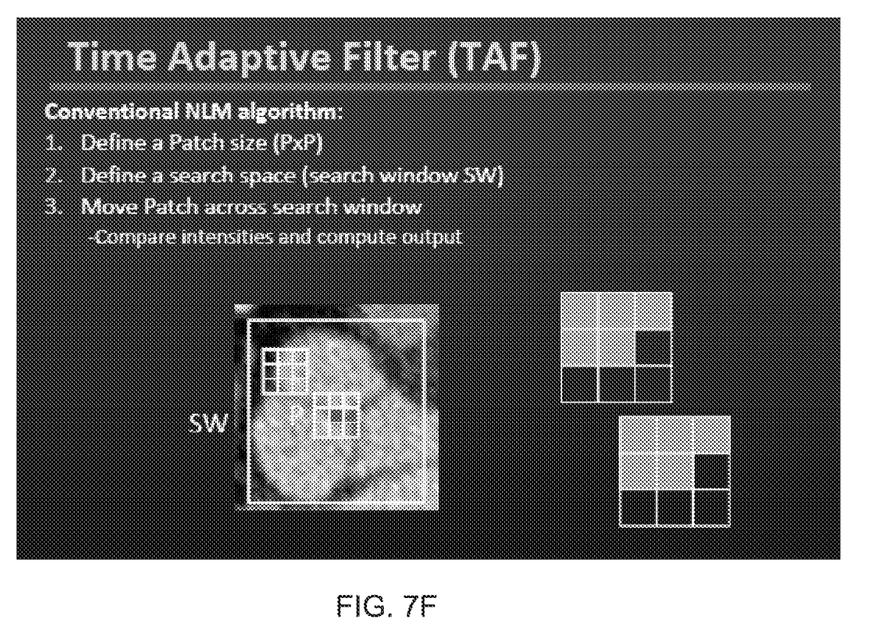
Figure 7G:
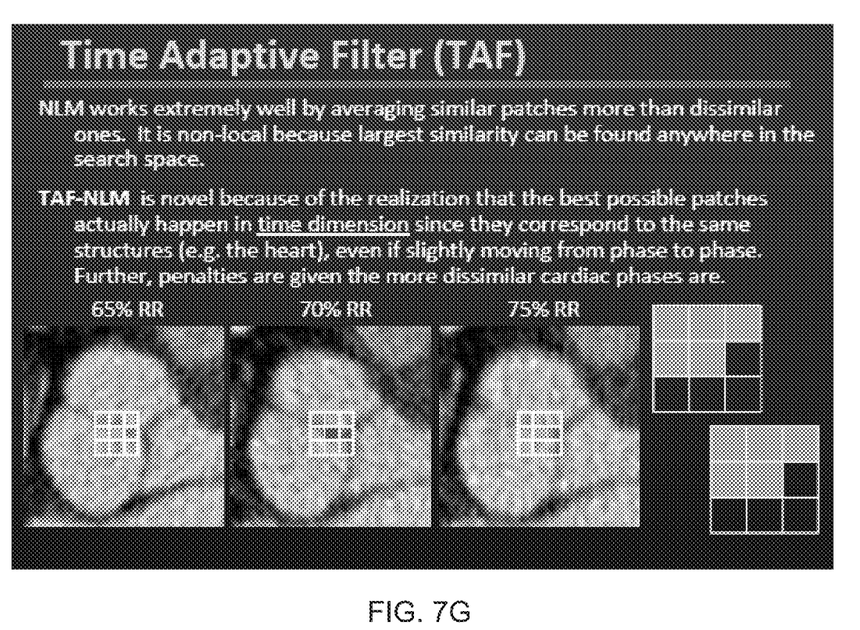

Steps of effectuating the application of the TAF are illustrated in FIGS. 7E through 7G.

Figure 8A:
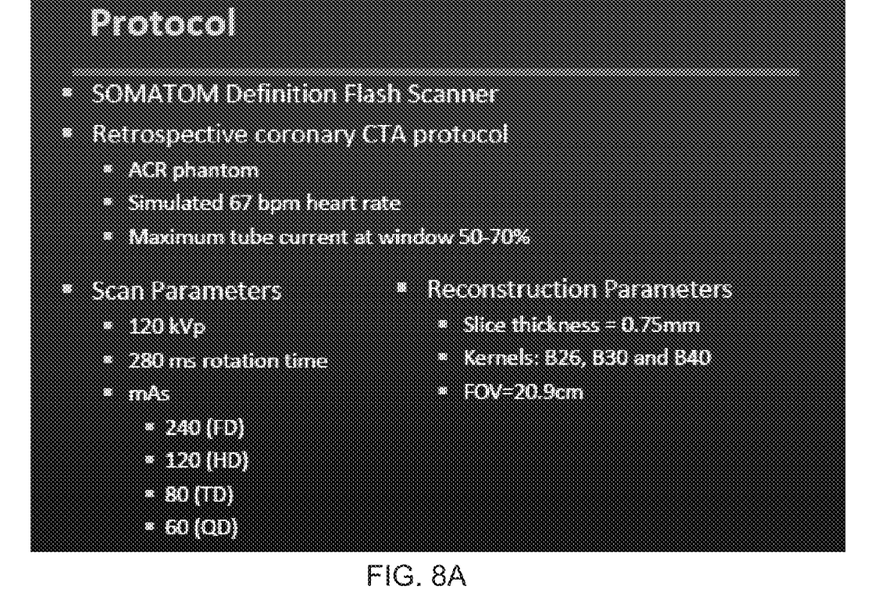
FIG. 8A is a diagram illustrating a CCTA protocol used according to a specific embodiment of the invention.
Figure 8B:
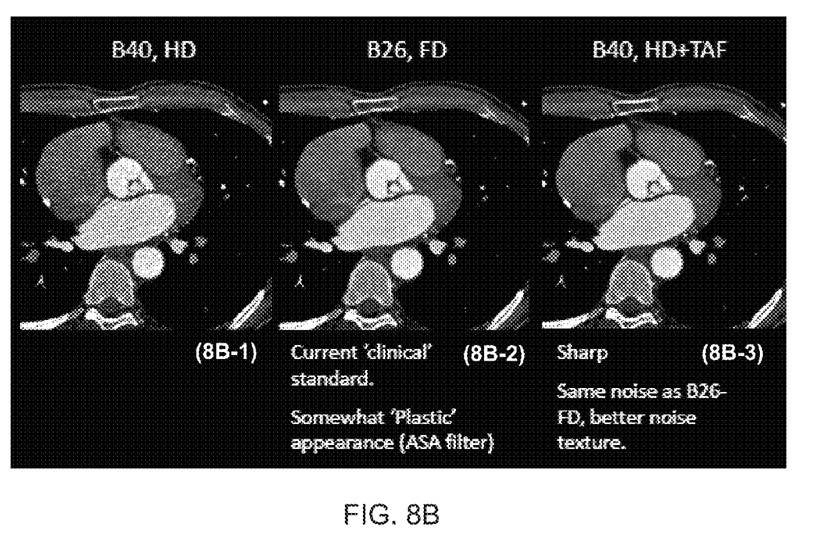
FIG. 8B, 8C are sample images formed, in each figure, from imaging data acquired from a patient according to traditional method of data acquisition and according to an embodiment of the invention including the TAF algorithm.
Figure 8C:
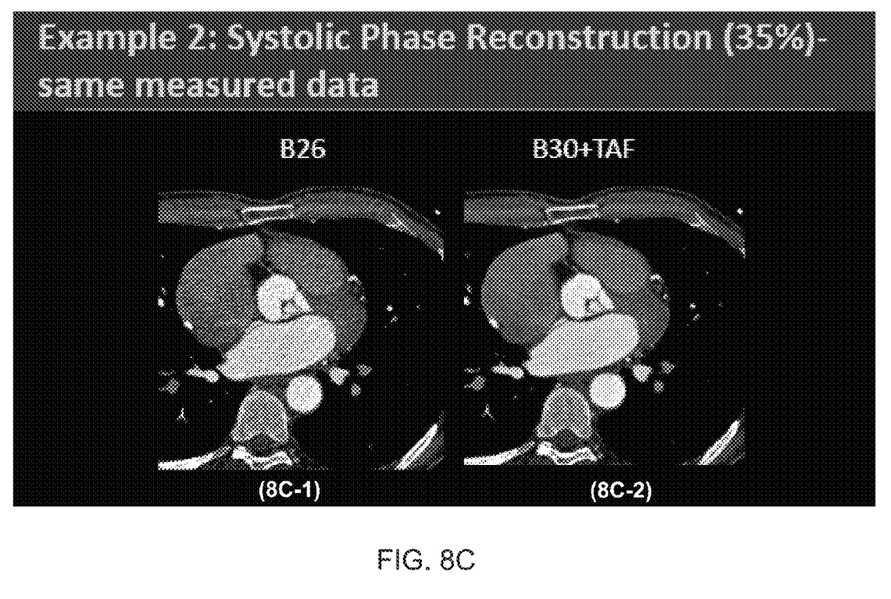
Figure 9A:
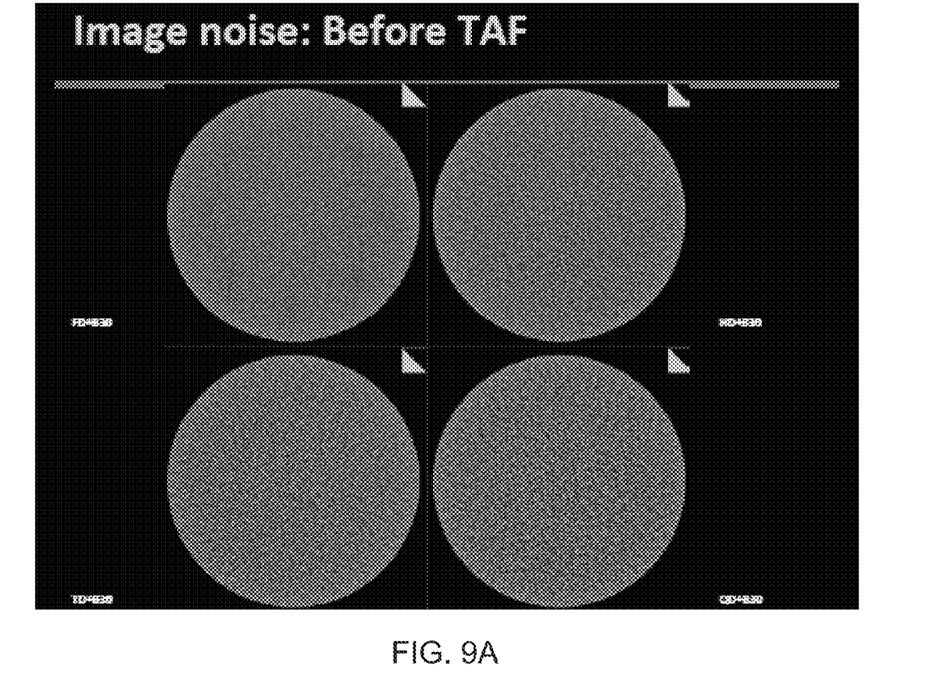
FIGS. 9A, 9B illustrate image noise, in phantom experiments, before and after the application of the TAF algorithm during the data-processing.
Figure 9B:
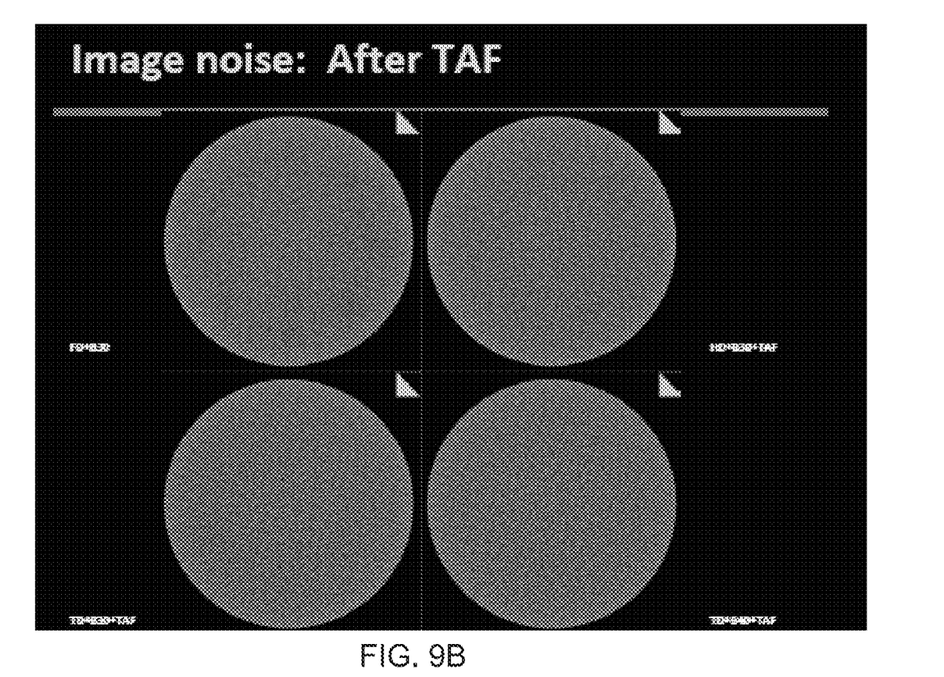
Figure 10A:
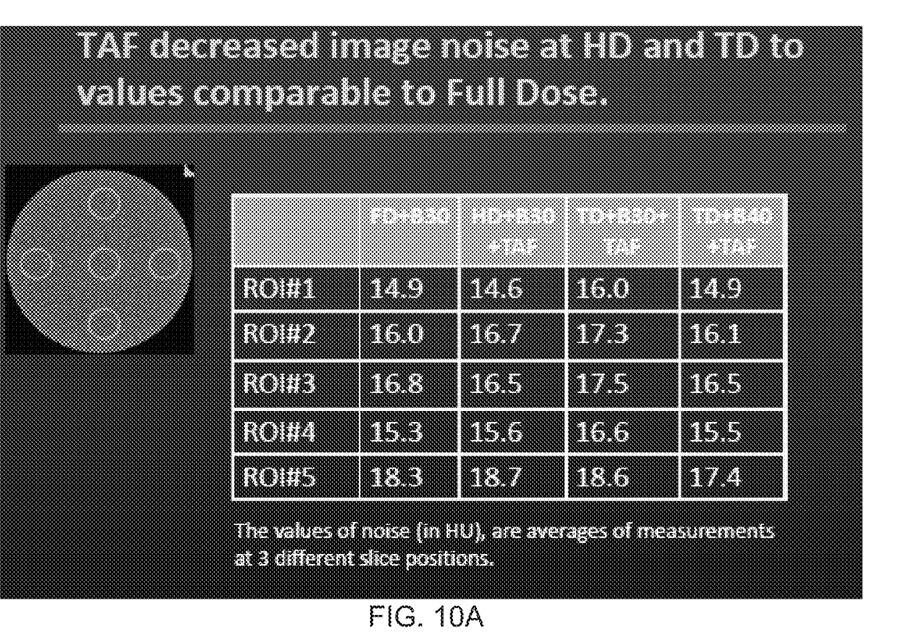
FIGS. 10A, 10B are diagrams, in phantom experiments, illustrating the reduction of noise and preservation of the accuracy of the CT numbers, in phantom experiments, due to application of the TAF algorithm to the data acquired with an embodiment of the invention.
Figure 10B:
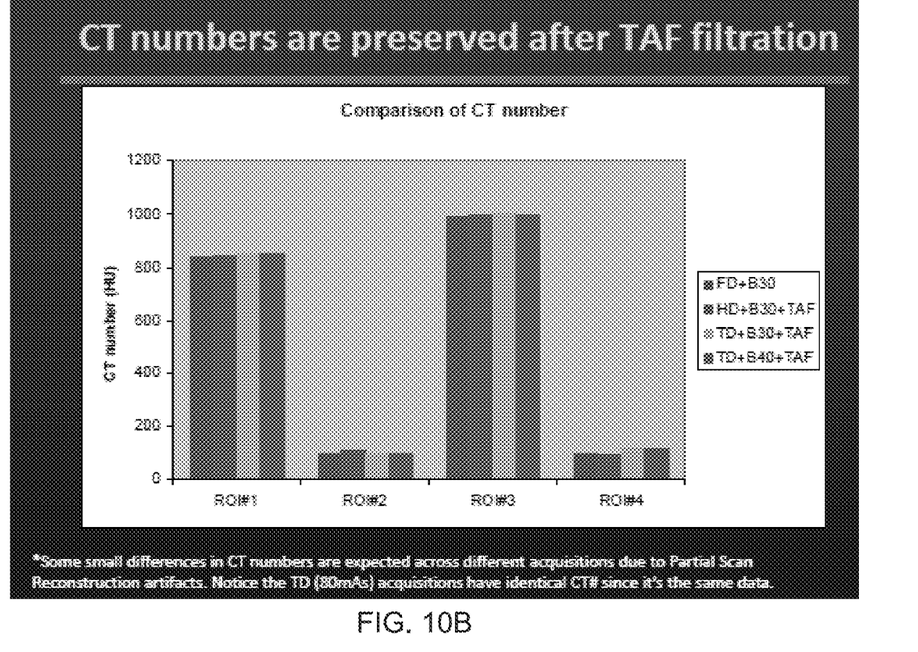

Examples of the results of application of the TAF method to image reconstruction in patient experiments, are illustrated in FIGS. 8B and 8C. FIGS. 8B, 8C provide images corresponding to diastolic and systolic portions' image reconstruction, respectively. An advantage noted with the application of the TAF according to a methodology described in reference to FIG. 6 was the clear preservation of the texture of the CT images as compared with a regular image filter method (compare, for example, image 8B-3 with images 8B-1 and 8B-2 of FIG. 8B and image 8C-2 with image 8C-1 of FIG. 8C), independently supported by the noise power spectrum analysis. Under a protocol detailed in FIG. 8A, additional results of characterization of image noise, prior to and after the application of the TAF filter is illustrated in diagrams of FIGS. 9A, 9B, and summarized in the table of FIG. 10A. (In the above-mentioned Figures, the notations B26, B40 and the like identify specific filtered backprojection kernels and relate to a degree of smoothing employed in adaptive smoothing algorithms. The notation of 35% in FIG. 8C, for example, relates to the cardiac phase corresponding to the approximately 35% level of RR interval of the cardiac cycle measured from R to R peak waves of the ECG signal.) The diagram of FIG. 10B attests to the fact that the application of the TAF substantially does not change the CT numbers. Additionally, the application of the TAF does not change the spatial resolution of the acquired images and preserves the CT slice thickness.

Figure 11A:
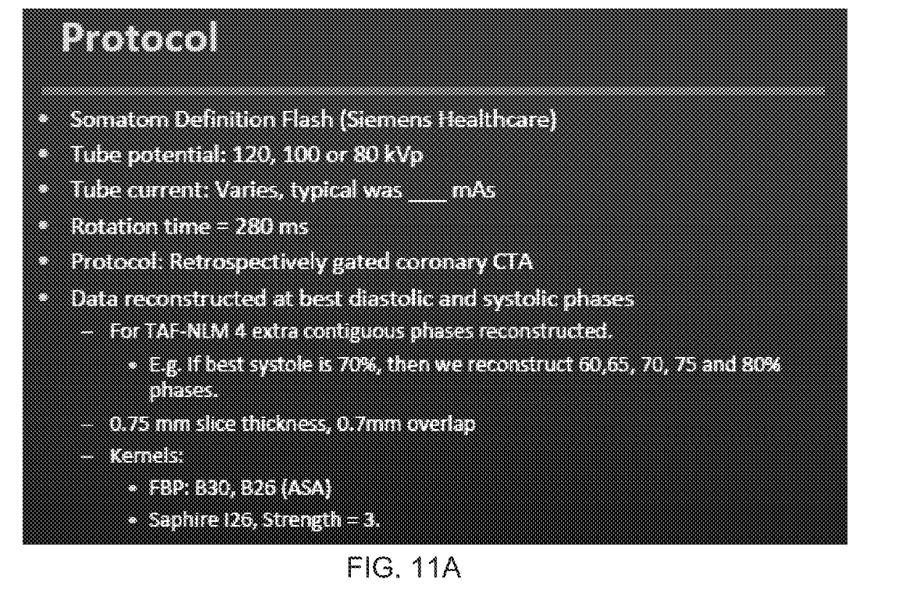
FIGS. 11A and 11B illustrate an experimental CCTA protocol and images of the heart in a clinical case obtained, with CCTA having such protocol, according to an embodiment of FIG. 6.
Figure 11B:
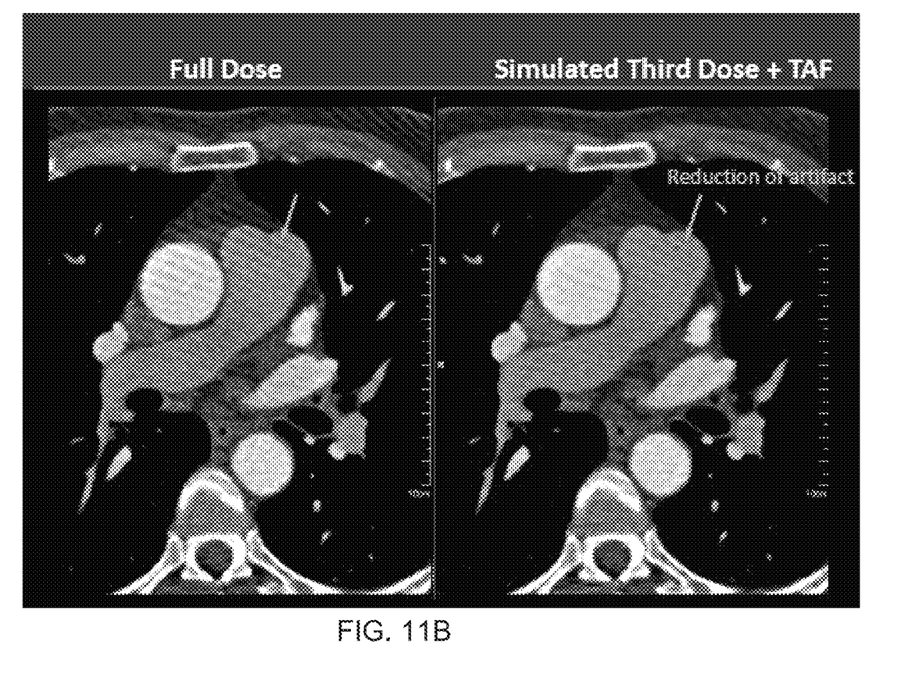

FIGS. 11A, 11B provide illustrations to an example of protocol and results of simulations of application of an embodiment of the invention in a clinical setting. FIG. 11B clearly showing a reduction of image noise and streak artifacts in an image, which has been obtained with only a third of the full dose, in the diastolic phase, but filtered with the TAF as described in reference to FIG. 6, as compared with an image acquired with a full dose of radiation.

In accordance with examples of the embodiments described herein, a method for cardiac CT is provided that facilitates acquisition of CT images at low radiation dosages without sacrificing temporal and spatial resolution characteristics of images.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. It is understood that in the drawings, the depicted structural elements are generally not to scale, and certain components may be enlarged relative to the other components for purposes of emphasis and clarity of understanding. It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, in the schematic logical flow chart diagram the depicted order and labeled steps of the logical flow are indicative of one embodiment of the presented method. Other steps and methods may be conceived that are equivalent in function, logic, or effect to one or more steps, or portions thereof, of the illustrated method.

The invention as recited in claims appended to this disclosure is intended to be assessed in light of the disclosure as a whole, including features disclosed in prior art to which reference is made.

It will be understood by those of ordinary skill in the art that modifications to, and variations of, the illustrated embodiments may be made without departing from the disclosed inventive concepts.

What is claimed is:

1. A method for reducing noise and artifacts in cardiac imaging with the use of a computed tomography (CT) system, the method comprising:
    acquiring multiple sets of medical imaging data during different consecutive cardiac phases of a cardiac cycle with the use of radiation provided by the CT system, each set of said data representing a heart of a subject at a respectively corresponding cardiac phase, said multiple sets of data respectively associated with heart images corresponding to said different consecutive cardiac phases; and
    in a computer process, applying a time-adaptive filtering algorithm to data contained in at least two sets of data to form a set of low-noise imaging data, said applying carried out such that
        mutually corresponding first data points from the at least two sets of data are filtered to a lesser degree than mutually corresponding second data points from the at least two sets of data,
        the first data points representing first image pixels first intensities of which rapidly change between cardiac phases associated with said at least two sets of data,
        the second data points representing second image pixels second intensities of which do not exhibit rapid changes.

2. A method according to claim 1, wherein said acquiring includes acquiring multiple sets of imaging data at cardiac phases chosen such that a radiation dose received by the heart throughout these cardiac phases accounts for a majority of a radiation dose received by the heart during the cardiac cycle.

3. A method according to claim 1, further comprising reconstructing an image of the heart, acquired while undergoing motion, using at least the set of low-noise imaging data.

4. A method according to claim 1, wherein said applying a time-adaptive filtering algorithm includes averaging CT slices of the different consecutive cardiac phases with respectively-corresponding weighting factors in a temporal domain.

5. A method according to claim 4, wherein a weighting factor is defined as $$D = \exp\left[-\frac{d(\xi, r)^2}{2\sigma_d^2}\right],$$

where $d(\xi, r)$ is a function that measures a duration of time corresponding to a separation between a center voxel, at $r$, of an image of the heart and a neighboring voxel, at $\xi$, of said image, and $\sigma_d$ is a distance coefficient.

6. A method according to claim 5, wherein $\sigma_d$ is dependent on a function representing modulation of a strength of said time-adaptive filtering algorithm.

7. A method according to claim 5, wherein $$\sigma_d = \sigma_t + c\sigma_t \exp\left(-\frac{b(r)^2}{2\sigma_b^2}\right),$$

$\sigma_t$ is a user-defined coefficient controlling the minimum amount of time-adaptive filtering, $\sigma_b$ is an adaptive weight coefficient controlling an extent of time-adaptive filtering, and $b(r)$ measures temporal change of data $r$.

8. A method according to claim 1, wherein said acquiring includes
    acquiring a first set of medical imaging data representing the heart during a first portion of the cardiac cycle, which first portion corresponds to a first dose of radiation provided by the CT system, said first set of medical imaging data containing first multiple CT slices;
    acquiring a second set of medical imaging data representing the heart during a second portion of the cardiac cycle, which second portion corresponds to a second dose of radiation provided by the CT system, said second dose being higher than the first dose, said second set of medical imaging data containing second multiple CT slices,
    wherein at least one of the first multiple slices and second multiple slices are not associated with the same portion of the cardiac cycle.

9. A method according to claim 8, wherein the acquiring a first set of medical imaging data and the acquiring a second set of medical imaging data are such that a radiation dose received by the heart during said first and second multiple CT slices accounts for a majority of a radiation dose received by the heart during the cardiac cycle.

* * * * *